2,267,091

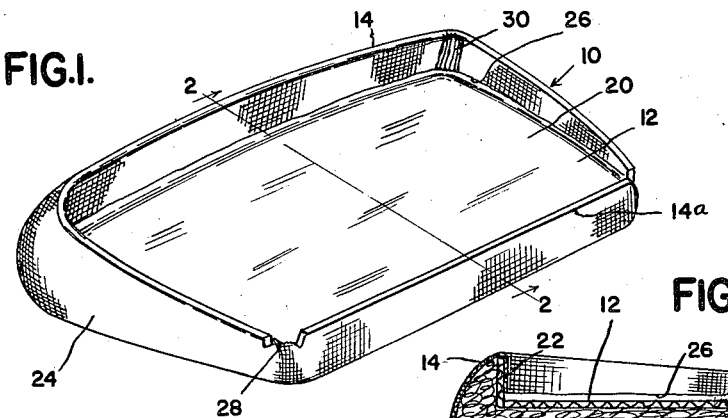
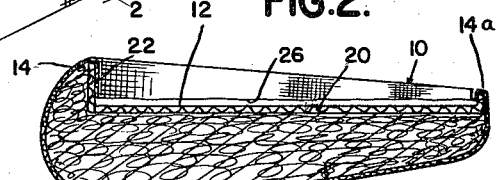
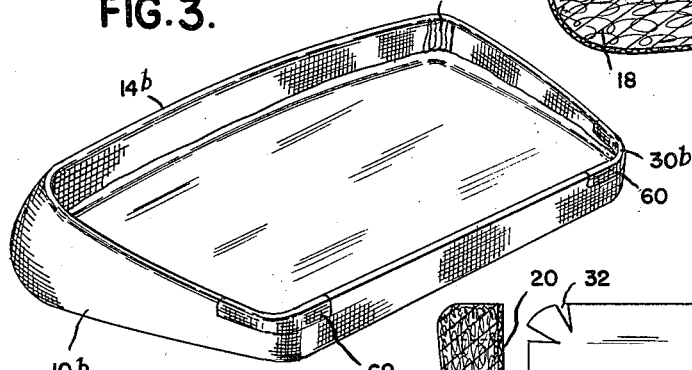
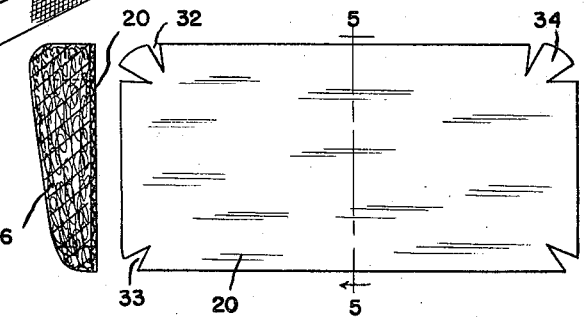
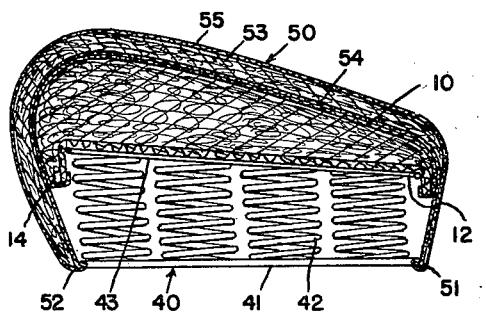
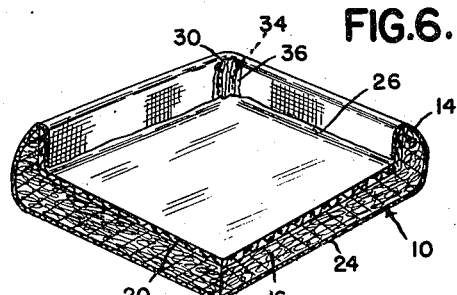
INVENTORS
JACK C. GORDON
EDWARD R. DETRICK
BY Whittemore, Hulbert & Belknap
ATTORNEYS Patented Dec. 23, 1941

UNITED STATES PATENT OFFICE

2,267,091

UPHOLSTERY UNIT AND METHOD OF MAKING SAME

Jack C. Gordon and Edward R. Detrick, Detroit, Mich., assignors to National Automotive Fibres, Inc., Detroit, Mich., a corporation of Delaware and Allen Industries, Inc., Detroit, Mich., a corporation of Delaware Application April 5, 1939, Serial No. 266,216

1 Claim. (Cl. 155—184)

The present invention relates to an upholstery unit and more particularly to a unitary padded construction adapted to be positioned intermediate a spring unit and an upholstery fabric.

The upholstery unit which forms the subject-matter of the present invention is capable of many diverse applications, but is particularly useful in automotive upholstery, and we have therefore chosen to illustrate the present invention as applied to automotive upholstery. It is to be understood this disclosure is intended to be illustrative only and in no sense limiting.

At the present time seats in automotive vehicles comprise a spring unit ordinarily out of the coil spring type over which it is necessary to position a pad, preferably of highly resilient unwoven fibrous material, such for example as cotton. The trim material is positioned over this pad and may be in the form of a stuffed pleated unit, or the trim fabric may be applied directly over the pad. In order to prevent the pad, as formerly provided, from working downwardly into the spring unit, it was common practice to provide a so-called insulator intermediate the spring unit and the pad. This insulator took many forms, one of which was simply a piece of burlap stiffened by short lengths of wire.

Heretofore loose or untreated cotton batting has been employed in cushions of this type; consequently it was difficult to prevent such loose cotton from rolling or moving out of place or forming bumpy top surfaces for the mohair or other fabric trim material when the latter was applied to the cushions. Moreover, due to handling in the trim shops and natural structural disintegration, a considerable quantity of such loose or untreated cotton was lost. It was also customary to fold a portion of the padding downwardly over the upper border wire of the supporting spring structure, and this not only consumed much time and labor but oftentimes resulted in cotton being lost.

With the foregoing in mind, it will be apparent that the final assembly of a vehicle seat was relatively slow and required considerable skill on the part of the upholsterer. Such procedure made it possible to upholster the spring structures on a commercial basis, but it was found in practice that the results were not uniform. The pad was subject to rupture if placed under any strain, and further, since it was not definitely positioned relative to the spring unit, it was apt to slip thereon, with the result that portions of the underlying structure were not sufficiently padded.

Therefore it is an object of the present invention to provide an upholstery unit which overcomes the major disadvantages inherent in the present construction.

It is a further object of the present invention to provide an upholstery unit which is adapted to withstand comparatively severe handling without damage.

It is a further object of the present invention to provide an upholstery unit which is constructed and arranged to obviate the necessity of a separate spring insulator.

It is a further object of the present invention to provide an upholstery unit constructed and arranged to be structurally interlocked with a cooperating spring unit.

It is a further object of the present invention to provide an upholstery unit over which the trim fabric or cushion may be applied without the possibility of damage to the upholstery unit.

It is a further object of the present invention to provide a composite upholstery unit comprising an upper pad and a lower base having a recess adapted to receive the upper portion of the spring unit.

It is a further object of the present invention to provide a composite upholstery unit comprising an intermediate delicate fiber pad interposed between reinforcing and protective elements.

It is a further object of the present invention to provide in an upholstery unit, a base having depending marginal flanges forming corners adapted to position the unit definitely relative to a spring unit in which the corners are strongly reinforced.

Other objects of the invention will be apparent as the description proceeds, and when taken in conjunction with the accompanying drawing, wherein:

Figure 1 is an inverted perspective of an upholstery unit according to the present invention;

Figure 2 is a section on the line 2—2, Figure 1;

Figure 3 is an inverted perspective of a slightly different embodiment of our invention;

Figure 4 is a plan view of the composite precut pad and base used to form the unit shown in Figure 3 prior to formation;

Figure 5 is a section on the line 5—5, Figure 4;

Figure 6 is a detailed perspective partly in section, illustrating the corner construction employed in the present invention; and Figure 7 is a vertical section through a complete seat construction illustrating the manner of using an upholstery unit made according to the present invention.

Referring first to Figures 1 and 2, we illustrate in inverted position an upholstery unit 10 which is provided with a recess 12 defined by normally depending marginal flanges indicated generally at 14.

As best seen in Figure 2, the unit 10 is made up of an intermediate tapered pad 16 formed of an unwoven loosely integrated fibrous material, such for example as cotton. The pad 16 is preferably tapered from front to rear, the thickest portion thereof, indicated at 18, being at the front of the unit. Associated with the pad 16 is a base member 20 which is of relatively strong material and is substantially form-retaining. The material of the base 20 may be selected from a wide variety of materials. Excellent results are obtained when the base 20 is formed of a coarse fiber, such for example as sisal, jute, hemp, or the like. This material is preferably employed in the form of a blanket, needled, felted or otherwise treated.

If preferred, the base 20 may be formed of a boardlike material, such for example as a deformable fiberboard, or the like. It may, on the other hand, be formed of a strong paper, a stiff cloth, or the like. In some instances, the base 20 may be formed of molded rubber, or similar material. The selection of material will be governed by practical considerations, the chief requirement being that it shall reinforce the pad, and, as assembled, be substantially form-retaining.

The base 20 is provided with depending marginal flanges 22 and the pad 16 has its marginal portions formed over the flanges 22 to form the composite flanges 14, previously referred to. The flanges may conveniently be provided by bending the edges of the base 20.

In order to provide a strongly reinforced element which may be handled without injury to the product, we prefer to provide a fabric cover indicated at 24 which overlies the pad 16 and which has its marginal edges 26 secured to the base 20. Preferably, edges 26 are folded into the interior of the recess 12 and secured therein, as by adhesion to the inner surfaces of the flanges 22 of the base 20. If desired, the fabric 24 may have its marginal edges adhesively secured to the upper surface of the base 20. The chief consideration is that the delicate fiber pad 16 shall be enclosed by fabric 24 and shall be attached thereby to the base 20. The fabric 24 may be a very cheap material since it is not subjected to substantial strains, either in handling or subsequent use. We have found that tobacco cloth is entirely satisfactory for this purpose, although, if preferred, other material, such for example as muslin, netting, or the like, may be substituted therefor.

Where the base 20 is formed of a coarse fibrous material, we prefer to treat the base with an adhesive stiffening binder. This binder may be applied to the base 20 in a variety of manners. For example, the base 20 may be completely impregnated with the material. In this case, there is additional adhesion between the base 20 and the pad 16. Preferably, however, this adhesive binder is applied to the base 20 as a spray coating applied to the upper surface of the base, as seen in Figures 1 and 3. This spray coating penetrates somewhat into the upper surface of the base and serves three important functions. After treatment with the adhesive binder, the upper surface of the base 20 is preferably subjected to compressive force which mats together loose fibers on the surface thereof, and which forms a substantially sealed surface. This surface, in use, rests directly on top of the spring unit and takes the place of the spring insulator, previously referred to. The surface prevents downward sifting of the fibers of the base 20 and, as will be evident, further protects the delicate structure of the pad 16.

The adhesive binder serves the additional function of substantially stiffening the base 20. As previously stated, it is desired that the base 20 shall be form-retaining, or in other words, that during handling it shall strongly retain the formation shown in the drawing. The adhesive binder serves the purpose of substantially stiffening the base, with the result that the flanges 22 and 14 will be reinforced.

The third function of the adhesive binder referred to is to serve as the adhesive agent for securing the marginal edges 26 of the cover fabric 24 to the flanges 22 of the base 20. If desired, additional adhesive may be applied either to the flange 22 or the marginal edge portions 26 of the fabric, or in some instances other securing means, such for example as staples, sewing, or the like, may be employed.

As illustrated in Figure 1, the flanges 14 are preferably continuous across the front of the pad and along both ends thereof. The flange at the rear of the pad, which in Figure 1 we have indicated at 14a, may be separate from the end flanges, and in this figure we have illustrated at 28 a cut-out portion. It will be appreciated that in order to position the unit 10 over a spring unit, it is necessary only to provide two definitely located corners, such for example as the corners 30 indicated in Figure 1.

A slightly different embodiment is illustrated in Figure 3, which differs from the embodiment shown in Figure 1 only in that the flange 14b is continuous completely around the periphery of the pad 10b. The front corners 30a and the rear corners 30b of this flange are formed in the same manner as the corners 30 of Figure 1.

Referring now to Figures 4 and 5, we show in these figures a composite structure comprising the base material 20 and the pad material 16 precut to a shape which permits formation of the material to the form illustrated in Figure 3. In these figures we have indicated at 32 and 33 notches cut adjacent the corners of the composite pad, which permit bending of the edges to form the flanges 14 previously referred to.

In Figure 4 we have illustrated a pair of notches 32 adjacent one corner and a single notch 33 at another corner. It will be evident that either construction may be employed, the essential factor being that sufficient material is removed in the notches to bring the adjacent edge portions into abutment when the flanges are formed at substantially right angles to the plane of the composite structure. Where a pair of notches 32 are employed, as will be evident from Figure 4, an intermediate corner portion 34 is provided.

As will be evident, when the edges of this composite pad are folded to form the flanges the adjacent edge portions formed by the notches 32 are brought into abutting relation. The adhesive binder with which the base material 20 has been treated serves to adhesively unite these edges and to retain the flanges in bent position.

While this adhesive union between the edges formed by the notches 32 tends to retain the flanges in form-retaining position, it is preferable to provide additional means for insuring retention of the bent formation. The cover fabric or sheeting 24 serves this additional function.

Referring now to Figure 6, we have shown a unit 10 having flanges 14 formed thereon by bending the edge portions of the composite structure composed of the pad 16 and the base 20 at substantially right angles to the plane of the composite structure. This results in the cut edges of the unit, and particularly of the base 20, being brought into abutting relation where they are adhered together by the adhesive binder previously referred to. The cover fabric or sheeting 24 which overlies the unit 10 has its marginal portions 26 bent inwardly and adhered to the inner surface of the flanges 22 formed on the base 20. As will be evident, adjacent the corners 30 there is a surplus of this fabric which is gathered into folded and overlapped relation and is adhered in this position, as indicated at 36. This formation serves the function of strongly reinforcing the corners 30.

It has been found that the reinforcing effect of gathering together and adhesively uniting overlapping folds 36 of the fabric 24 provides an adequate reinforcement for the corners 30 of the depending flanges. However, in some instances, it may be desirable to provide an additional reinforcement, and this may take the form of a separate strip of material 60 adhesively secured around a corner formed by adjacent flange sections. This material 60 may be a suitable fabric and may if desired be positioned on the outside of the corners or it may be folded over so as to be adhesively secured to both the inside and the outside of the flanges around the corners thereof.

The method of making the upholstery unit which has been previously described lends itself admirably to large scale production. The detail steps of the method of manufacture are reviewed here.

The fabrics 24 are precut in any desired manner and are preferably supplied in piles. The cotton 16 and the base 20 are cut to the desired shape including the formation of the notches adjacent the corners. If desired, the cotton pad 16 and the base 20 may be separately cut and later assembled, or, if preferred, they may be cut together as a unit.

If the pad 16 and the base material 20 are separately cut to the desired shape they are next assembled and are brought into the relationship illustrated in Figures 4 and 5. At this time, preferably the edges of the cotton pad 16 are feathered by the removal of some of the padding material adjacent the edges. This feathering step provides tapered edges at all sides of the pad, such as illustrated in Figure 2. This results in a smoother completed product for the reason that bulky edges of padding material are not present under the trim material.

The assembly of the upholstery unit is completed by placing the pad 16, together with the associated base member 20, over a cover fabric 24 in centered relation. As previously stated, the cover fabric 24 is somewhat larger than the pad and base member, with the result that there is an edge 26 of the cover cloth extending beyond the edge of the base and pad member.

The upper surface of the base 20 is treated with a suitable adhesive binder. This may be done after preliminary assembly with the cover fabric, or, if preferred, it may be accomplished previously. It has been found that this treatment of the base 20 may be accomplished by spraying the exposed surface of the base member 20 with a suitable adhesive, such for example as latex. If desired, a coating of the adhesive may also be applied to the exposed edge 26 of the sheeting 24.

At this time the edges of the base member 20 are formed upwardly with the result that the edges formed by the notches 32 and 33 are brought into abutment. The adhesive applied will be sufficient to cause adherence between the edges, with the result that a marginal flange will be formed around the periphery of the unit. This flange may be continuous, as shown in Figure 3, or may be interrupted, as indicated in Figure 1. The next step in the manufacture of the unit is to fold the extending edges 26 of the sheeting 24 upwardly around the flanges 22 formed in the base material. As will be evident, this operation also results in forming the feathered edges of the cotton pad 16 around the corners formed by the flanges 22, and the parts will take the relationship illustrated in Figure 2. The extending edges 26 of the sheeting 24 are then formed into the interior of the recess 12, and are adhesively secured to the inside surface of the flanges 22. This operation may be performed manually, and it is found that rapid production may be obtained.

As will be evident, the fabric or sheeting 24, when folded into the interior of the recess 12, provides a certain amount of fullness adjacent the corners 30 formed by the flanges 22. The operator gathers this fullness together to form crumpled folds, which are adhesively united to the inner surface of the flanges. This results in a strongly reinforced corner which will serve definitely to position the unit relative to the associated spring unit in the completed assembly.

In order to understand the advantages afforded by the present construction, we have illustrated in Figure 7 a complete spring construction embodying the present invention. In this figure a spring unit 40 comprises a lower base 41, coil springs 42, and an upper border wire 43 which is resiliently sprung from the base 41 by the coil springs. The upholstery unit 10 which forms the subject-matter of the present invention is placed over the spring 40 so that the flanges 14 surround the upper border wire 43. In other words, the upper portion of the spring unit 40 is received within the recess 12 provided at the underside of the unit 10. The trim material indicated generally at 50 is positioned over the upholstery unit 10 and is secured as indicated at 51 and 52 adjacent the lower portion of the spring unit 40. In this figure we have illustrated the trim material as in the form of a stuffed, pleated cushion comprising an intermediate pad 53 of padding material, such for example as loosely integrated cotton, a backing 54 of sheeting and the usual covering of trim fabric 55, which may be mohair, broadcloth, leather, artificial leather, or the like. Pads of this type are normally provided with seams extending from front to back of the cushion. If preferred, the trim fabric 55 may be applied directly over the upholstery unit 10.

Having now described the structural features characterizing our invention, we shall now describe the manner in which the same is assembled in the vehicle, pointing out the numerous advantages which follow the improved construction. As previously stated, prior practice has been to place a delicate pad of fibrous material, such as cotton, over the spring unit, preferably interposing an insulator between the spring unit and the pad. This pad of loosely integrated fibrous material was not positioned by coacting structural elements on the spring unit and, therefore, tended to slip thereon during the subsequent assembly operations and in use. Furthermore, when the trim material was placed over the pad there was a tendency for the pad to break or tear when strains were imposed thereon. In order to avoid faulty construction, it was necessary for the upholsterer to exercise considerable care and skill in placing the upholstery fabric over the pad. In the first place, it was necessary to draw the edges of the pad downwardly over the border wire 43 in order to insure proper padding of this member. In mass production irregularities unavoidably appeared and considerable time was necessary to obtain acceptable results.

According to the present invention, the upholstery unit 10 is strongly reinforced and need not be handled with care. The delicate fibrous material in the pad 16 is strongly protected between the intermediate reinforcing base 20 and the sheeting 24. The unit 10 is provided with depending flanges 14 and corners 30 which coact with the upper portion of the spring unit 40 in order to position the unit definitely thereon. As previously stated, it is unnecessary that the flanges 14 extend completely around the periphery of the pad, since the front corners 30 formed by the flanges 14, shown in Figure 1, serve to position the unit definitely over the spring unit. However, it is in some ways preferable to provide a continuous flange, such as 14b shown in Figure 3, so that once positioned on the spring unit the upholstery can not inadvertently be shifted in any direction relative thereto.

When the upholstery unit 10 is placed over the spring unit, as best shown in Figure 7, the depending flanges insure proper padding for the edges of the upper border wire 43 of the spring unit without the necessity of further manipulation.

In addition to serving the function of protecting the fragile padding material 16 during intermediate handling, the cover fabric or sheeting 24 further serves the useful function of providing a surface over which the upholstery material 50 may be drawn without possibility of rupture or shifting of the padding material.

When the upholstery unit forming the subject-matter of the present invention is employed, the steps of upholstering the seat of a motor vehicle comprises the following: The upholstery unit 10 is placed upon the spring unit 40 so that the corners 30 thereof receive the corners of the upper border wire 43 of the spring unit. The trim material 50 is then drawn over the upholstery unit and is secured adjacent the lower portion of the spring unit. The operation is much more rapid than conventional prior practices, the results are uniformly good, and the excellence of the results does not depend upon the skill of the operator. Further, the necessity for a separate insulator is avoided. The base 20 serves the multiple function of insulator, positioning member for the unit, protection for the delicate fibrous pad during handling, and where it is formed of a fibrous or resilient material it further adds to the padding function of the unit.

We have previously referred to the multiple function of the adhesive binder, and at this time it is desired to point out that this binder may be selected from a large group of materials. It has been found that latex is admirably suited for the present purpose. However, other materials may be substituted, and among these are natural or artificial resins and asphaltic or bituminous compositions.

In cases where the base 20 is formed at a molded rubber or a boardlike material, it will normally be unnecessary to provide the adhesive binder except around the flanges 22 thereof, in order to secure the marginal portions 26 of the fabric 24 thereto.

While we have illustrated and described several specific embodiments of our invention, it will be apparent to those skilled in the art that various additions, modifications, omissions, combinations and substitutions may be made which will be within the spirit and scope of our invention as defined by the appended claim.

What we claim as our invention is:

A self-contained upholstery unit comprising a form retaining base having a downwardly opening recess adapted to receive the upper portion of a spring structure, said base being formed of aggregated unimpregnated relatively coarse fibers such as sisal, jute, or the like treated with a stiffening binder, a pad overlying said base formed of relatively soft unimpregnated relatively fine fibrous material such as cotton, and a fabric covering overlying said pad and having its edges extending around the lower edges of said recess and secured within the latter.

JACK C. GORDON.
EDWARD R. DETRICK.